(12) United States Patent
Nam

(10) Patent No.: US 6,886,319 B2
(45) Date of Patent: May 3, 2005

(54) FOLDING RAKE

(76) Inventor: Ki-Bok Nam, 408-20 Clark Ave., Thornhill, Ontario (CA), L3T 1R9

( * ) Notice: Subject to any disclaimer, the term of this patent is extended or adjusted under 35 U.S.C. 154(b) by 110 days.

(21) Appl. No.: 10/290,464

(22) Filed: Nov. 8, 2002

(65) Prior Publication Data

US 2004/0088962 A1 May 13, 2004

(51) Int. Cl.⁷ ............................................. A01D 76/00
(52) U.S. Cl. ................................................. 56/400.12
(58) Field of Search ....................... 56/400.12, 400.16, 56/400.06, 400.04; 294/50.6, 50.8

(56) References Cited

U.S. PATENT DOCUMENTS

| | | | |
|---|---|---|---|
| 211,855 A * | 2/1879 | Kinzer | .................. 294/11 |
| 2,148,772 A | 2/1939 | Olson | |
| 2,908,131 A | 10/1959 | Ross | |
| 3,164,945 A | 1/1965 | Spencer | |
| 3,350,866 A | 11/1967 | Spencer | |
| 3,601,966 A | 8/1971 | Kerry | |
| 3,688,484 A | 9/1972 | Cox | |
| 3,692,347 A * | 9/1972 | Bixler | .................. 294/50.8 |
| 3,833,250 A | 9/1974 | Lawrence | |
| 4,037,397 A * | 7/1977 | Fiorentino | ............... 56/400.12 |
| 4,378,671 A * | 4/1983 | Gascon | .................. 56/400.12 |
| 4,514,970 A * | 5/1985 | Wilson | .................... 56/400.12 |
| 4,730,864 A * | 3/1988 | Sample | ...................... 294/50.9 |
| 4,991,386 A | 2/1991 | Dirksen | |
| 5,564,266 A | 10/1996 | Laughlin | |
| 5,564,267 A | 10/1996 | Bricker | |
| 5,901,540 A | 5/1999 | Vella | |
| 6,502,381 B2 * | 1/2003 | Crites | ...................... 56/400.12 |

* cited by examiner

Primary Examiner—Árpád Fábián Kovács
(74) Attorney, Agent, or Firm—Dowell & Dowell, P.C.; Nancy E. Hill; Hill & Schumacher

(57) ABSTRACT

A folding rake is for facilitating the raking and picking up of the raked material. The folding rake includes a first rake and a second rake that are releasably restrained relative to each other in a rake position and may be released and moved into a folded position. The first rake has a first head portion and a first handle portion. Similarly the second rake has a second head portion and a second handle portion. The second handle portion is pivotally attached to the first handle portion. In the rake position the first and second handle portions are generally axially aligned. In the folded position the first head portion and the second head portion are generally adjacent to each other.

2 Claims, 6 Drawing Sheets

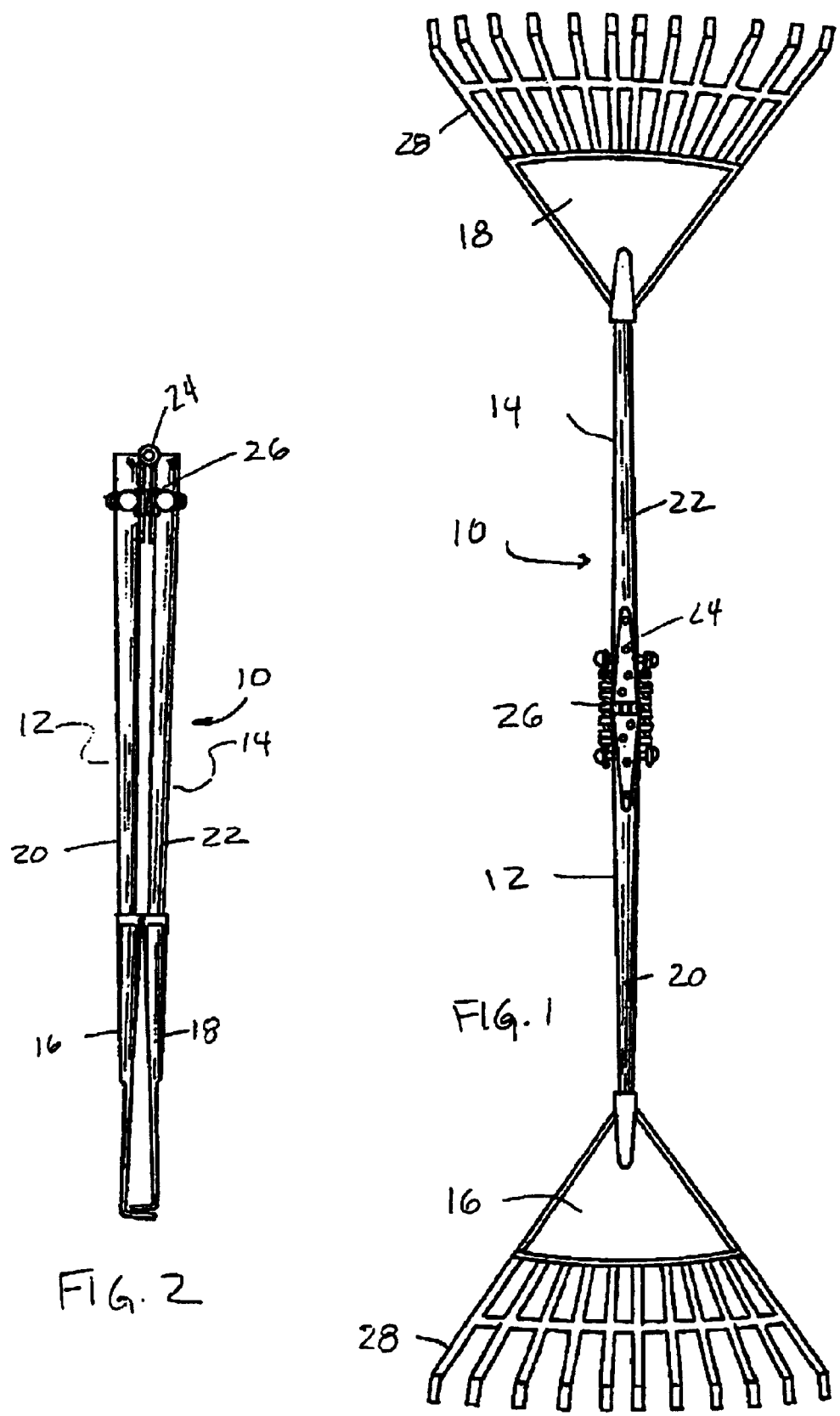

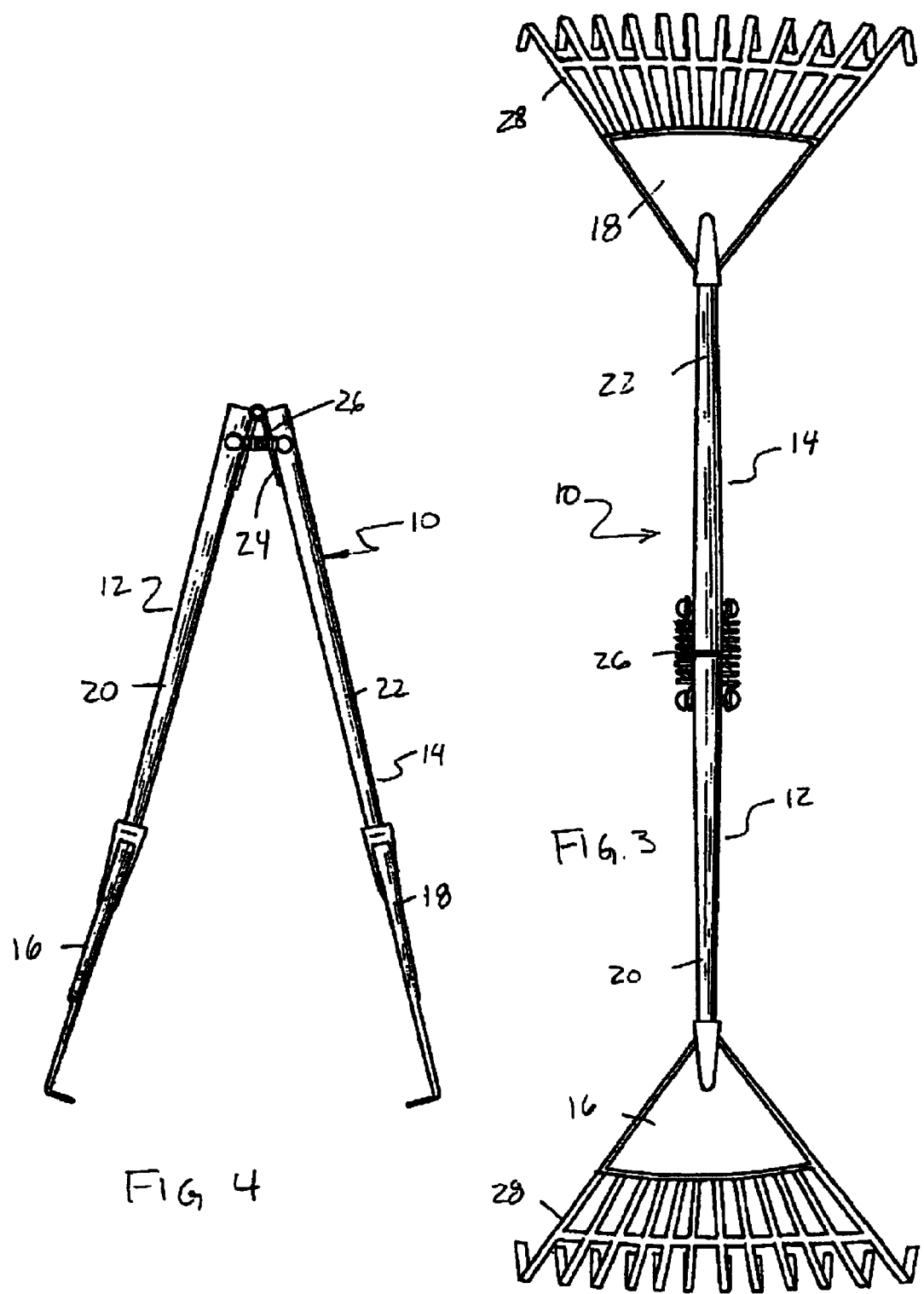

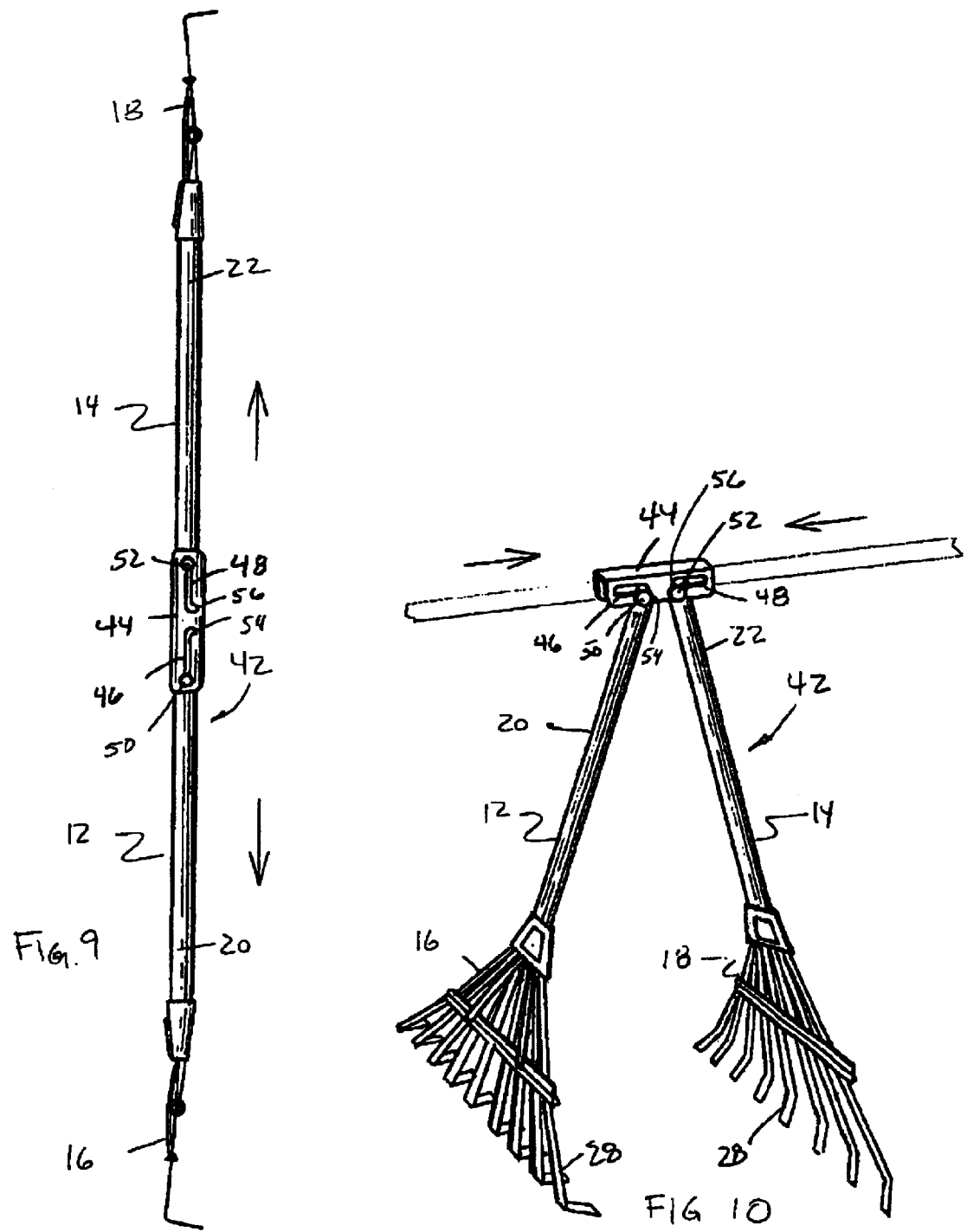

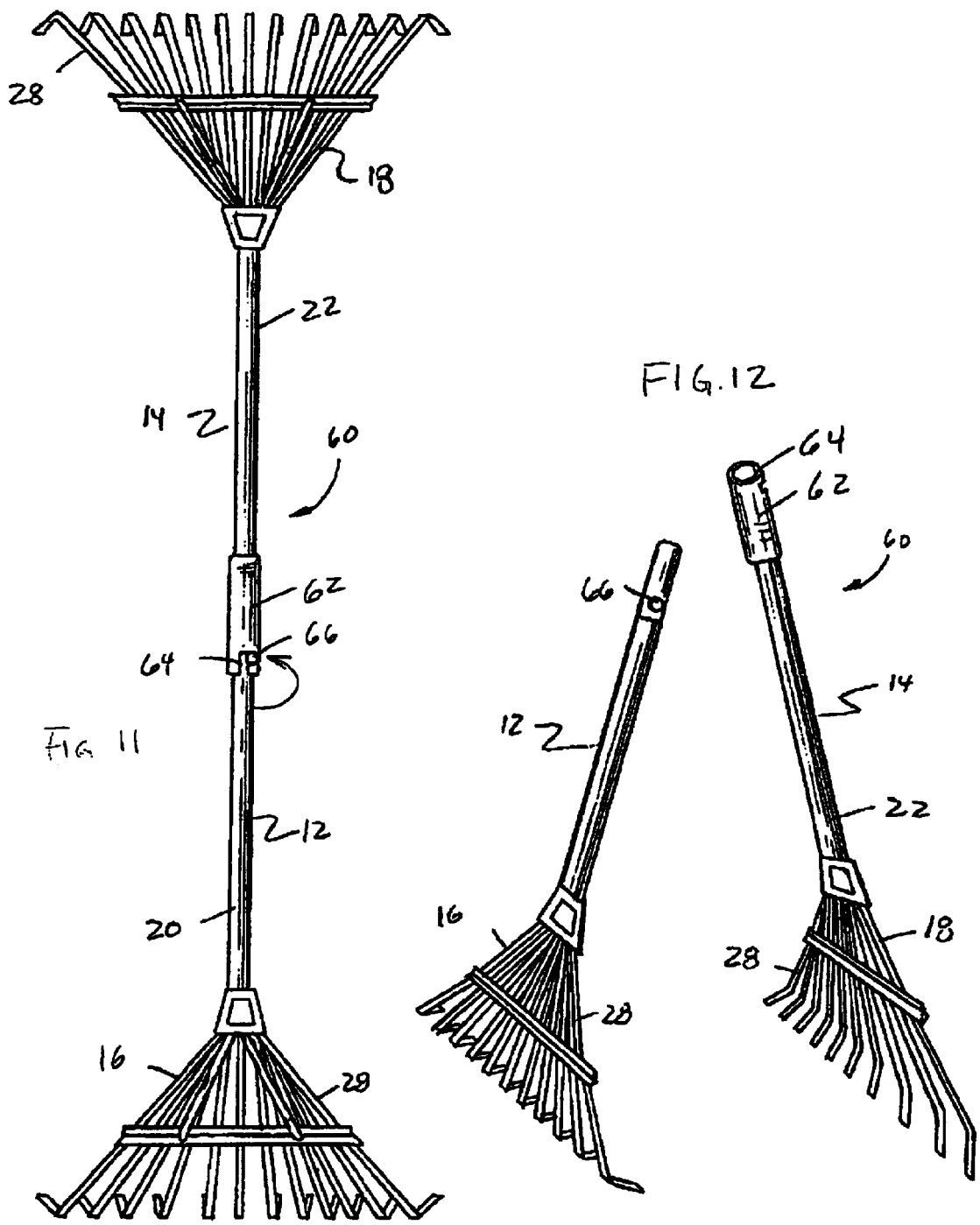

under review

FOLDING RAKE

FIELD OF THE INVENTION

This invention relates to rakes and in particular rakes that have been modified to facilitate picking up leaves and the like.

BACKGROUND OF THE INVENTION

Gardening tools are well known and have been used for centuries. In particular rakes for collecting grass and leaves from a lawn are well known. Although conventional rakes are relatively efficient at gathering material into a pile it is still quite difficult to pick up the material and put it in a bag or other receptacle.

Accordingly a number of inventions have been suggested for improving rakes to facilitate picking up the material. For example U.S. Pat. No. 3,688,484 issued to Cox on Sep. 5, 1972, U.S. Pat. No. 4,991,386 issued to Dirksen on Feb. 12, 1991 and U.S. Pat. No. 5,564,266 issued to Laughlin on Oct. 15, 1996 are all quite similar. These patents show two rakes pivotally attached together generally in the middle of the elongate handles. Accordingly, during raking, the user would have to hold too handles, thus increasing the weight and making the use somewhat more difficult. A somewhat different design is shown in U.S. Pat. No. 3,833,250 issued to Lawrence on Sep. 3, 1974. This patent shows two rakes, each having a handle which is hingedly attached at opposed ends of a cross-handle. The three handles are arranged such that they may be held in axial alignment. It appears that the Lawrence rake would be somewhat difficult to use In both the rake mode, since the cross-handle looks awkward, and In the picking up mode, since the cross-handle looks like it might interfere.

Accordingly it would be advantageous to provide a rake that can easily move from a raking mode to a picking up mode. Further it would be advantageous to provide a rake that is easy to manufacture and easy to use.

SUMMARY OF THE INVENTION

The present invention is directed to a folding rake for facilitating the raking and picking up of the raked material. The folding rake Includes a first rake and a second rake that are releasably restrained relative to each other in a rake position and may be released and moved Into a folded position. The first rake has a first head portion and a first handle portion. Similarly the second rake has a second head portion and a second handle portion. The second handle portion is pivotally attached to the first handle portion. In the rake position the first and second handle portions are generally axially aligned. In the folded position the first head portion and the second head portion are generally adjacent to each other.

In another embodiment the folding rake includes a first and second rake that are releasably attachable. The first rake has a first head portion and a first handle portion. The second rake has a second head portion and a second handle portion. The second handle portion is releasably attached to the first handle portion. When attached the first and second handle portions are generally axially aligned.

Further features of the invention will be described or will become apparent In the course of the following detailed description.

BRIEF DESCRIPTION OF THE DRAWINGS

The invention will now be described by way of example only, with reference to the accompanying drawings, in which:

FIG. 1 is a front view of the folding rake of the present invention shown in the rake position;

FIG. 2 is a side view of the folding rake shown in the fully folded position;

FIG. 3 is a back view of the folding rake shown in the rake position;

FIG. 4 is a side view of the folding rake shown in a partially folded position;

FIG. 9 is a side view of a second alternate embodiment of the folding rake of the present invention shown in the rake position;

FIG. 10 is a perspective view of the folding rake of FIG. 9 shown in a partially folded position;

FIG. 11 is a back view of a third alternate embodiment of the folding rake of the present invention shown in the rake position; and FIG. 12 is a perspective view of the folding rake of FIG. 11 shown in an in use position.

DETAILED DESCRIPTION OF THE INVENTION

Figures 5, 6:
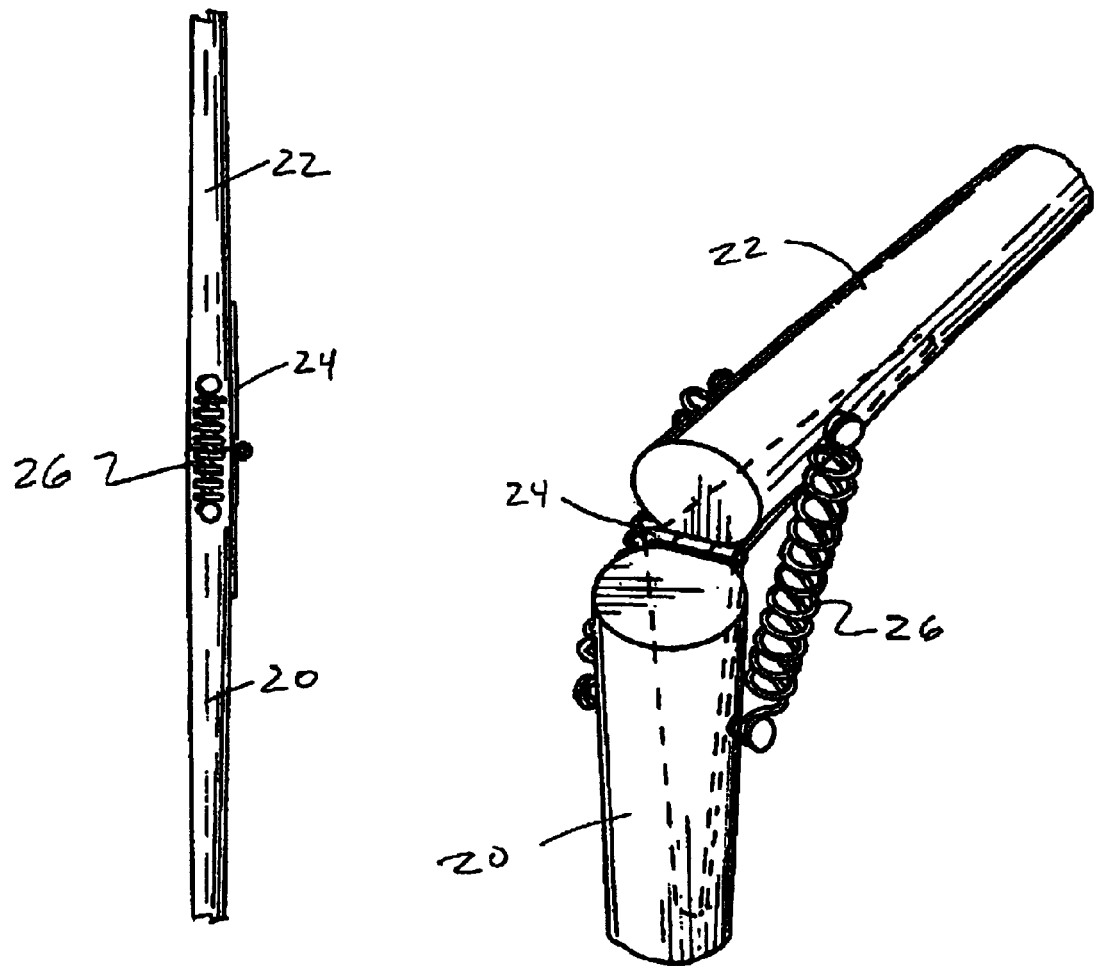
FIG. 5 is an enlarged perspective view of the folding clamping mechanism of the folding rake of FIG. 1 shown in a partially folded position.
FIG. 6 is an enlarged side view of the folding clamping mechanism of the folding rake of FIG. 1 shown in the rake position.

Referring to FIGS. 1 through 4, the clamping folding rake of the present invention is shown generally at 10. The rake 10 includes a first rake 12 and a second rake 14. The first and second rake each have a head portion 16, 18 and a handle portion 20, 22.

Referring to FIGS. 5 and 6, the distal ends of the first and second handle portions 20, 22 are hingeably attached together with a hinge 24. A coiled spring 26 holds the handle portions 20 and 22 into axial alignment when the rake is In the rake position shown in FIGS. 1 and 3. When the rake moves from the rake position to the folded position spring 26 biases first head portion 16 towards second head portion 18. Spring 26 allows the clamping folding rake 10 of the present invention to be folded and unfolded in a resilient fashion. As shown in FIGS. 2 and 4 the first and second head portions 16, 18 may be brought adjacent to each other when the rake 10 is folded. The spring 26 serves to give a resilient force for the handle portions 20, 22 to stay unfolded during raking. Thereby one of the head portions 18 is prevented from being in the way of the other head portion 16 which could cause an interruption in raking. In the rake position, the end surfaces of the handle portions 20, 22 are abutted against each other, thereby preventing the rake from folding, as best seen in FIG. 6. The spring 26 also serves to impart enough pressure for the handle portions 20 and 22 to be partially folded when collecting the raked materials.

Each of the first and second head portions 16 and 18 is a generally V-shaped head with a plurality of tines 28. It will be appreciated by those skilled in the art that alternate head portions could be used that would still be within the scope of this invention.

It will be appreciated by those skilled in the art that there are a number of variations of the folding rake of the present invention that would stay within the spirit of the invention. Hereafter some alternate embodiments will be described. Those features which are common to rake 10 described above will be not be described in detail.

Figures 7, 8:
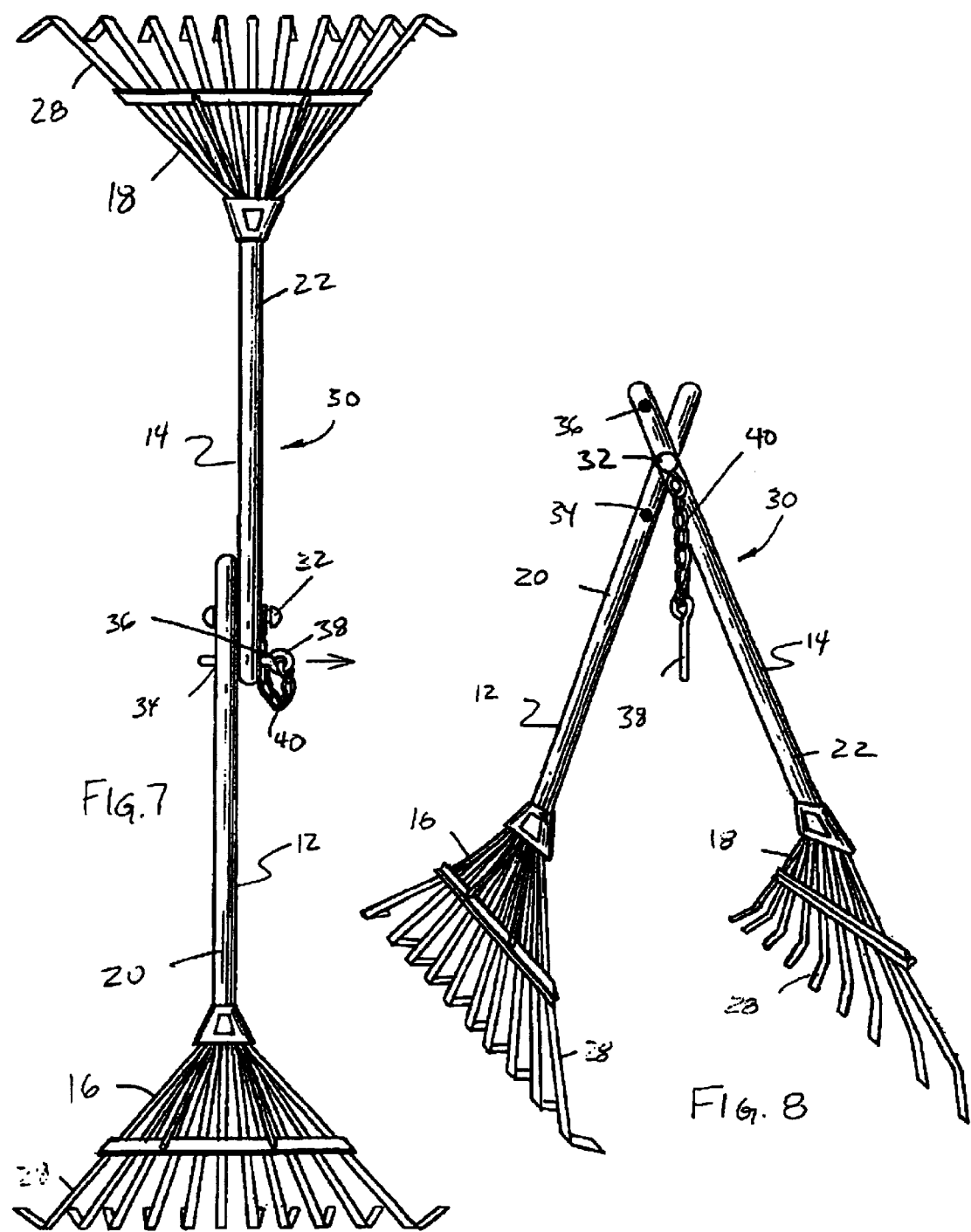
FIG. 7 is a back view of an alternate embodiment of the folding rake of the present invention shown in the rake position.
FIG. 8 is a perspective view of the folding rake of FIG. 7 shown in a partially folded position.

Referring to FIGS. 7 and 8, an alternate folding rake is shown generally at 30. In this embodiment first and second rake 12, 14 are pivotally attached with pivot 32. Each handle portion 20, 22 is provided with an aperture 34, 36 proximate to the pivot 32 which are adapted to receive removable pin 38. Pin 38 is attached to pivot 32 with a chain 40. As can be seen in the drawings functionally rake 30 is similar to rake 10 in that it has a rake position shown in FIG. 7 and a folded position shown in FIG. 8. In the rake position handles 20, 22 are generally axially aligned so that apertures 34, 36 are aligned and pin 38 is positioned therein to hold the handles in axial alignment. When pin 38 is removed the rakes 12, 14 are allowed to pivot relative to each other and the head portions 16 and 18 may be moved such that they are generally adjacent to each other to facilitate picking up material.

Referring to FIGS. 9 and 10 a second alternate rake is shown at 42. Rake 42 includes a generally C-shaped channel 44 adapted to hold handle portions 20 and 22 in axial alignment. Channel 44 has a pair of elongate slots 46, 48. Each elongate slot is generally L-shaped. Each handle portion 20 and 22 has a post 50, 52 adapted to slide along a respective slots 46, 48. The posts 50, 52 are positioned proximate to the distal end of the handle portions 20, 22 such that when posts 50, 52 are in the short arm 54, 56 of the L-shaped slot 46, 48 the ends of the handle portions 20, 22 do not hit the channel 44 so that they can move freely toward a folded position. The elongate L-shaped slot 46, 48 are arranged such that when the posts 50, 52 are at one end thereof the handle portions 20, 22 are generally axial aligned and the rake 42 is in the rake position as shown in FIG. 9. When the posts 50, 52 are at the other end thereof in the short arms 54, 56 of the elongate L-shaped slot 46, 48, the handle portions 20, 22 may be moved from the rake position to the folded position shown in FIG. 10.

Referring to FIGS. 11 and 12, a third alternate rake Is shown generally at 60. Rake 60 allows first rake 12 to be disengaged from second rake 14. Second rake 14 has a cuff 62 on the distal end of the handle portion 22 that Is adapted to fit over distal end of handle portion 20 of first rake 12. The cuff 62 includes an L-shaped notch 64 at the distal end thereof. A post 66 extends outwardly from handle portion 20 and is adapted to slide into notch 64 and to hold handle portions 20, 22 generally in axial alignment.

As used herein, the terms "comprises" and "comprising" are to be construed as being inclusive and opened rather than exclusive. Specifically, when used in this specification including the claims, the terms "comprises" and "compris-ing" and variations thereof mean that the specified features, steps or components are included. The terms are not to be interpreted to exclude the presence of other features, steps or components.

It will be appreciated that the above description related to the invention by way of example only. Many variations on the invention will be obvious to those skilled in the art and such obvious variations are within the scope of the invention as described herein whether or not expressly described.

What is claimed as the invention is:

1. A folding rake comprising:

a first rake having a first head portion and a first handle portion;

a second rake having a second head portion and a second handle portion, the first and second handle portions are pivotally attached with a hinge having one side attached to a distal end of the first handle portion and the other side attached to a distal end of the second handle portion; and a means for releasably restraining the first and second handle portions into a rake position and, on release, moveable from the rake position to a folded position whereby in the rake position the first and second handle portions are generally axially aligned and in the folded position the first head portion and the second head portion are generally adjacent, wherein the releasably restraining means includes a coiled spring with one end attached to the first handle portion and the other end attached to the second handle portion.

2. A folding rake comprising a first a rake having a first head portion and a first handle portion;

a second rake having a second head portion and a second handle portion, the second handle portion being pivotally attached to the first handle portion with a pivot; and a means for releasably restraining the first and second handle portions into a rake position and, on release, moveable from the rake position to a folded position whereby in the rake position the first and second handle portions are generally axially aligned and in the folded position the first head portion and the second head portion are generally adjacent, wherein the first rake includes a first aperture in the first handle portion and the second rake includes a second aperture in the second handle portion and wherein the releasably restraining means includes a pin adapted to engage and release the first and second apertures and when the pin is engaged in the first and second apertures the first and second handle portions are generally axially aligned.

* * * * *